United States Patent [19]
Smith

[11] 3,818,225
[45] June 18, 1974

[54] METHODS FOR THERMAL NEUTRON DIFFUSION COEFFICIENT LOGGING

[75] Inventor: Michael P. Smith, Bellaire, Tex.

[73] Assignee: Texaco, Inc., New York, N.Y.

[22] Filed: Sept. 18, 1972

[21] Appl. No.: 289,901

[52] U.S. Cl.................................. 250/264, 250/266
[51] Int. Cl.............................................. G01v 5/00
[58] Field of Search............. 250/83.1, 83.6 W, 264, 250/266

[56] References Cited
UNITED STATES PATENTS

| | | | |
|---|---|---|---|
| 2,971,094 | 2/1961 | Tittle | 250/83.1 |
| 3,373,280 | 3/1968 | Mills | 250/83.6 W |
| 3,491,238 | 1/1970 | Allen | 250/83.1 |
| 3,567,935 | 3/1971 | Nagel | 250/83.6 W |
| 3,621,255 | 11/1971 | Schwartz | 250/83.1 |

*Primary Examiner*—Harold A. Dixon
*Attorney, Agent, or Firm*—T. H. Whaley; C. G. Reis

[57] ABSTRACT

An illustrative embodiment of the present invention includes methods for thermal neutron diffusion coefficient logging. Two spaced thermal neutron detectors are deployed at different distances from a pulsed source of 14 MEV neutrons. Each detector samples the thermal neutron population over two different time intervals following the emission of a burst of neutrons by the source. Count signals from the detectors are combined according to predetermined relationships to derive signals representative of the thermal neutron diffusion coefficient, the initial neutron age, the porosity and the water saturation of the earth formations in the vicinity of the borehole.

10 Claims, 4 Drawing Figures

GENERALIZED DIFFUSION COEFFICIENT

NEUTRON AGE $D/D_0$ VERSUS $\phi$

OPEN HOLE
Fw IN BORE HOLE
LIME STONES

△ 6" BHD
⊙ 7½" BHD
□ 9" BHD

METHODS FOR THERMAL NEUTRON DIFFUSION COEFFICIENT LOGGING

BACKGROUND OF THE INVENTION

This invention relates to radiological well logging methods and apparatus for investigating the characteristics of subsurface earth formations traversed by a borehole and more particularly to methods and apparatus for measuring the porosity and water saturation of earth formations surrounding a borehole by the technique of measuring the thermal neutron diffusion coefficient.

It is well known that oil and gas are more likely be be found in commercially recoverable quantities from those earth formations which are relatively porous or permeable than in more highly consolidated earth formations. Thus, equipment and methods for accurately identifying the porosity, lithology and water saturation of earth formations has substantial industrial importance.

Various methods and apparatus have been proposed in the prior art for utilizing neutron diffusion through earth formations to measure porosity, neutron lifetime (thermal decay time) and water saturation. Typically, proposals for measuring porosity using these techniques have suggested the use of a pressure housing sonde containing a neutron source and a pair of gamma ray detectors spaced at different distances from the source for transport through a borehole. Captured thermal neutrons in the formation materials generate gamma rays which are detectable by means of the gamma ray detectors. The thermal neutron generators utilized in prior art techniques have been both pulsed and continuous neutron sources. Generally, some combination utilizing the count rate of detected thermal neutrons is related to the hydrogen content of the portion of the earth formation being subjected to the flow of neutrons from the neutron source. These methods have generally not proven to be as accurate as desirable due to the diameter irregularities of the borehole wall. Also, variation in the properties of different borehole fluids such as their salinity, the irregular cement annulus surrounding the casing in cased boreholes, and the properties of different types of steel casings have all tended to obscure the thermal neutron measurements as suggested in the prior art.

The thermal neutron population surrounding a sonde having a neutron source and gamma ray detector or detectors, as proposed in the prior art, can be affected by the chlorine content of the borehole fluid. Similarly, other lithological factors such as the boron content of the earth formations surrounding a cased borehole can affect a thermal neutron population at the different distances from the neutron source. Measurements of thermal neutron captures are utilized in neutron lifetime logs or thermal neutron population die away logs of various types as contemplated in the prior art. The present invention, however, utilizes two or more time dependent measurements of the actual thermal neutron population or epithermal neutron population at different radial distances from the neutron generator by means of two spaced neutron detectors, each longitudinally spaced from the neutron source and from each other. The use of a pulsed neutron source in the invention enables the thermal neutron populations at each detector made at a plurality of separate times after the neutron pulse to be combined to obtain a measurement of the thermal neutron diffusion coefficient. This quantity is a physical parameter of the earth formations material surrounding the borehole which has heretofore not been measured by prior art techniques. It has been recognized in the prior art that neutron diffusion can affect the measurement of the thermal neutron capture events and hence the capture cross-section and several heuristic approaches to correcting for this effect have been postulated. However, to date none of these approaches have been entirely successful.

Thus, it is an object of the invention to provide improved method and apparatus for measuring the thermal neutron diffusion coefficient of materials surrounding a well borehole.

Another object of the invention is to provide improved porosity determination in wellbore measurements by obtaining an accurate measurement of the thermal neutron diffusion coefficient.

A still further object of the invention is to provide improved porosity and water saturation determinations for wellbore materials by the use of pulsed neutron techniques in which the thermal neutron diffusion coefficient of materials in the vicinity of the wellbore is determined and used to improve the porosity and water saturation determinations.

In accordance with the invention, a relatively high intensity pulsed neutron source irradiates earth formations surrounding a well borehole with repetitive bursts of high energy neutrons. A pair of neutron detectors spaced longitudinally along the axis of the well tool from each other and from the neutron source measure the intensity of the thermal neutrons at the two differently spaced distances from the source at several discrete time intervals relative to the neutron bursts emitted by the source. The ratio of the counts occurring in each of the two spaced neutron detectors during the different time intervals following the neutron pulse may then be interpreted in terms of the neutron diffusion coefficient to yield improved earth formation porosity measurements and improved water saturation measurements in accordance with predetermined relationships. The methods and apparatus used in the present invention have been found to give improved results, particularly at the higher porosity ranges than those obtainable from prior art techniques.

For a better understanding of the present invention, together with other and further objects, features and advantages thereof, references made to the following detailed description taken in conjunction with the appended drawings in which:

DESCRIPTION OF THE PREFERRED EMBODIMENT

Figure 1:
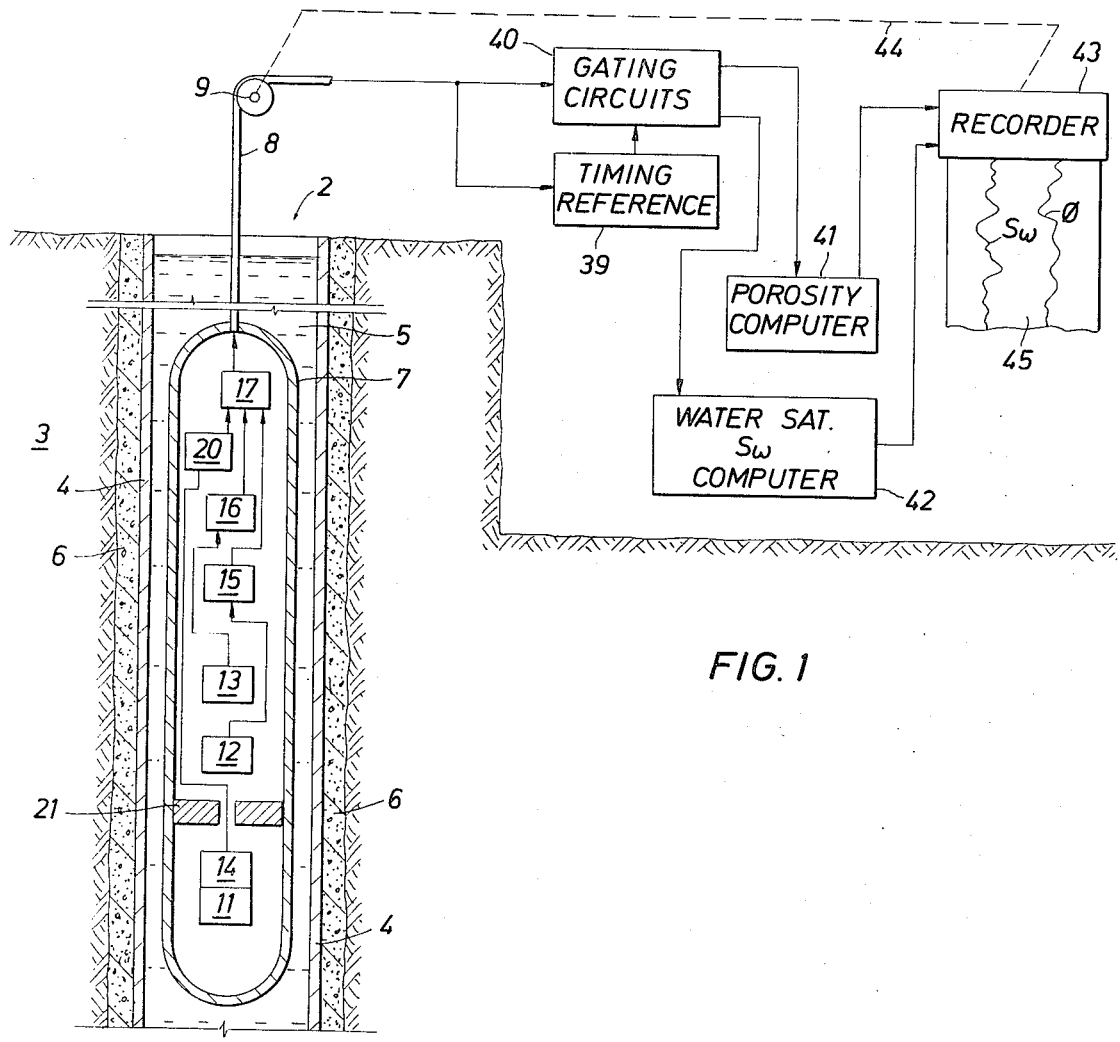
FIG. 1 is a schematic diagram showing a well logging system in accordance with the principles of the invention.

Referring initially to FIG. 1 there may be seen a simplified functional representation in the form of a block diagram of well logging apparatus in accordance with the present invention. A borehole 2 penetrating earth formations 3 is lined with a steel casing 4 and filled with a well fluid 5. While it will generally be the case that the borehole 2 has a well fluid 5 therein, this is not necessary for the present invention to perform, and air filled boreholes may be logged using the techniques of the invention if desired. The steel casing 4 is cemented in place by a cement layer 6 which also serves to prevent fluid communication between adjacent producing earth formations 3. While the invention is depicted being used in a cased borehole, it will be appreciated by those skilled in the art that it may be utilized for open hole logging as well, if so desired.

The downhole portion of the logging system is seen to be basically composed of an elongated, fluid tight, hollow body member or sonde 7, which during the logging operation is passed longitudinally through the borehole 2 and is sized for passage therethrough. Surface instrumentation, whose function will be discussed in more detail subsequently, is shown for processing and recording electrical measurements provided by the sonde 7. A well logging cable 8 passing over a sheave wheel 9 supports the sonde 7 in the borehole 2 and also provides a communication path for electrical signals to and from the surface equipment and the sonde 7. The cable 8 may be of a conventional armored well logging type and may have one or more electrical conductors for transmitting such signals between the sonde 7 and the surface apparatus.

Again referring to FIG. 1, the sonde 7 contains a source or accelerator 11 for producing high energy neutrons. The neutron source operating from the principle of the deuterium-tritium reaction. However, it will be understood by those skilled in the art that the invention is not limited to the use of such a deuterium-tritium pulsed neutron source. Other types of pulsed neutron sources may be used if desired. However, the $d,T$ generator provides the most energetic, deepest penetrating radiation of any source of practical interest. A suitable radiation detector pair 12 and 13 are provided in the sonde 7 for detecting thermal neutrons resulting from the diffusion and scattering of the high energy neutrons from the source 11 by earth formations 3 surrounding the well borehole 2. A radiation shield 21 of iron, lead or other suitable material may be interposed between the neutron accelerator 11 and the detectors 12 and 13 of the apparatus if desired. However, this is not necessarily included in the technique of the invention. The thermal neutron detectors 12 and 13 may comprise $He^3$ neutron detectors which are hollow body members filled with $He^3$ gas under pressure. Thermal neutrons entering the detectors interact with the $He^3$ nuclei and produce measureable electrical signals or pulses.

The electrical pulses from the upper detector 13 are supplied to an amplifier circuit 16 for signal amplification and from thence to a cable driver circuit 17 which may be of conventional design. Similarly, count pulses from the lower $He^3$ detector 12 are supplied to an amplifier 15 for signal amplification and from thence to the cable driver circuit 17 for transmission to the surface equipment via the well logging cable 8 as previously described.

The neutron accelerator 11 is preferably operated by a pulsing circuit 14 which may be of conventional design as known in the art and which functions to operate the accelerator to produce short duration bursts of high energy neutrons. The pulse duration is maintained preferably as short as is consistent with minimum borehole effects (about 50 microseconds). Timing pulses are supplied to a surface timing reference 39 and are communicated over the well logging cable 8 from a master clock 20. The master clock 20 also supplies operating pulses to the operational pulser 14 for driving the neutron accelerator 11. The repetition rate of the neutron bursts can be controlled by the frequency of the master clock 20. Of course it will be appreciated by those skilled in the art that the master clock 20 could be located at the surface and pulses utilized therefrom for transmission to the sonde to synchronize the operation of the system. In either case by utilizing a single master clock in the system, located either in the sonde as shown or at the surface, it is possible to achieve synchronization of the system.

Figure 3:
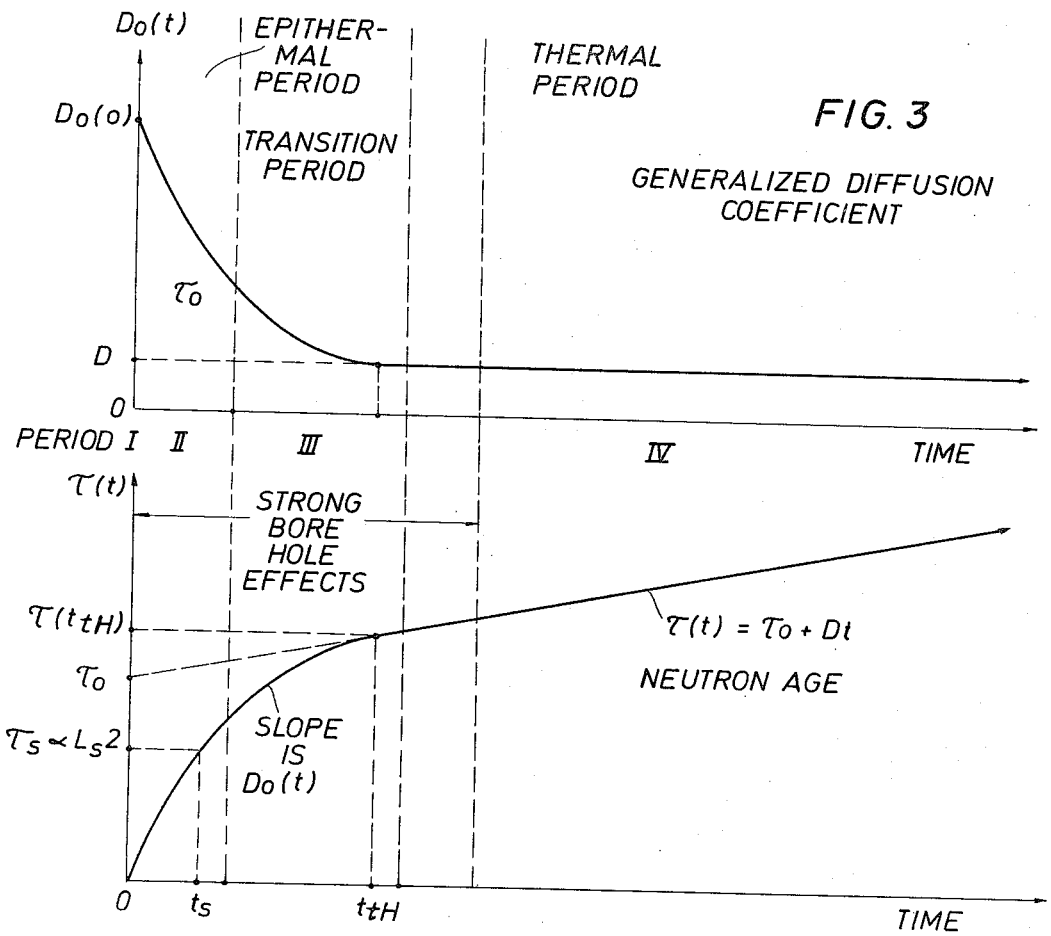
FIG. 3 is a graphical representation illustrating the thermal neutron population or age and thermal neutron diffusion coefficient as a function of time relative to a neutron pulse as interpreted in the present invention.

Timing pulses are also supplied from the master clock 20 via the timing reference 39 to gating circuits 40 for this end. The gating circuits 40 are operational to permit count pulses from the downhole tool detectors 12 and 13 to enter the porosity computer 41 and water saturation computer 42 during time intervals as illustrated in FIG. 3. The pulses from the different detectors 12 and 13 may be transmitted over different cable 8 conductors to distinguish them, or if the cable 8 is a one conductor cable, the pulses from the two detectors 12 and 13 may be coded either digitally or by analog means (as opposite polarity) to distinguish them at the surface. The porosity computer 41 and water saturation computer 42 operate to compute these quantities in the manner to be subsequently described based on the count measurements from the downhole neutron detectors 12 and 13 and to supply the porosity and water saturation information to the recorder 43 for interpretation. The recorder 43 may comprise a conventional strip chart type well logging recorder or may comprise a magnetic tape recorder as known in the art for this purpose. Preferably, the recorder 43 is mechanically or electrically linked to the sheave wheel 9 as indicated by the dotted line 44 so that the record medium 45 may be moved as a function of the borehole depth of the logging sonde 7. In this manner the quantities logged as measured by the downhole sonde may be recorded on the record medium 45 as a function of borehole depth.

Figure 2:
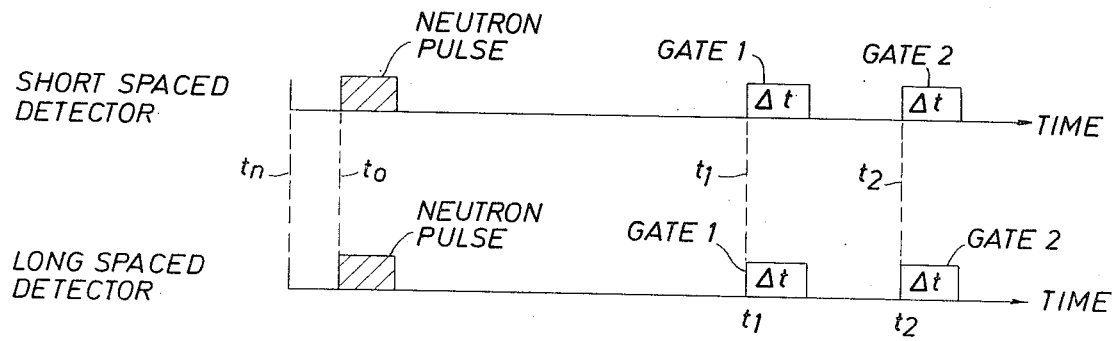
FIG. 2 is a relative timing diagram showing the detector measurement intervals relative to the neutron pulse of the technique of the present invention.

Referring now to FIG. 2 the timing of the system is illustrated in more detail. A timing reference pulse labeled $t_n$ and produced by the master clock 20 initiates an operating cycle of the apparatus. This pulse, as previously described, acts on the downhole pulser 14 causing a burst of high energy (14 MEV) neutrons to be emitted by the accelerator 11 in the downhole sonde as illustrated in FIG. 2. This neutron burst commences at a time $t_0$ as shown in the diagram of FIG. 2. Subsequent to the neutron burst the gate circuits 40 operate to permit count pulses from each of the downhole detectors 12 and 13 to be passed on to the data processing equipment during two gating intervals. A first gating interval commencing at a time $t_1$ and a second gating interval commencing at a time $t_2$, following the completion of the first gating interval. The gate open intervals and times during which the pulses are permitted to pass to the data processing circuits are shown in FIG. 2 as being of equal duration. It will be appreciated by those skilled in the art that the gate intervals for the short spaced detector and the long spaced detector may not be the same length or time duration for the invention to be operative. However, this simplifies the calibration techniques utilized with the invention and is compatible with the mathematical derivation to be discussed subsequently.

The count pulses supplied during the two gating intervals from each of the neutron detectors 12 and 13 in the downhole tool are supplied to the porosity computer 41 and the water saturation computer 42 which may comprise small general purpose digital computers programmed to perform the calculations of these quantities in the manner to be described from the equations to be developed. For example, a single small digital computer such as the PDP 11 computer produced by the Digital Equipment Corporation of Cambridge, Mass. could be used for this purpose. The solution of the equations (9) through (13) may be programmed for such a computer, for example, in the FORTRAN language. Such programs would be apparent to those skilled in the art given the techniques of the invention, such as the equations (9) to (13) and hence need not be detailed.

Referring now to FIG. 3, two graphical representations are illustrated which show the generalized diffusion coefficient $D_0$ and the neutron age $\tau$ plotted as a function of time. The neutron age $\tau$ is measured in square centimeters; it represents the square of the distance the neutron travels from birth to capture. The diffusion coefficient $D_0$ is related to the neutron age according to the relationship shown on the graph of FIG. 3. (Also see equation (5).) It will be observed that after the emission of a burst of high energy neutrons, for some duration strong borehole effects dominate the neutron diffusion coefficient and the neutron age parameters, obscuring slowing down and thermalization features. However, after sufficient time, the borehole effects essentially die out and also the generalized neutron diffusion coefficient $D_0$ reaches an asymtotic value D. This quantity (D) is useful as explained subsequently in determining an improved porosity measurement of the formations surrounding the well borehole and to obtain lifetime measurements corrected for diffusion. In a typical 15 percent porosity sandstone formation the time period labeled period II in the graphical representations of FIG. 3 ends at approximately 30 microseconds after the cessation of the neutron pulse (period I). Period II is the time of maximum spreading of the neutrons outward from the source (large $D_0$ values). The neutron thermalization time or time at which the neutron population generally has decayed from its initial high energy to thermal energy will occur in this (15 percent porosity sandstone) formation at approximately 350 microseconds. This time is labeled $t_{th}$ on the graphs of FIG. 3. Finally, the measurement period (period IV) of the graphs of FIG. 3 commences approximately 500 microseconds after the cessation of the neutron pulse. In period IV the neutrons continue to diffuse at thermal energies, but do not spread outward as much (low $D_0$ values) as in period II. By making the measurements in period IV strong borehole effects are eliminated from the measurements. Periods I to IV shown in FIG. 3 are not sharply defined for moderators commonly found in logging applications, these graphs being illustrative only.

A major difficulty in using the 14 MEV generator to measure porosity with a count ratio from a dual spaced $He^3$ detector pair is the loss of sensitivity for porosities greater than about 20 percent in the system. Operating the generator in pulsed mode to gate out borehole effects can improve this situation. However, this does not result in a significant improvement in sensitivity. In order to increase the porosity sensitivity of the system the following technique, in which the thermal neutron diffusion coefficient D is obtained and used to make corrective enhancement of the measurements, may be utilized.

L and $T_0$, the thermal neutron diffusion length and thermal neutron lifetime respectively, are related to the thermal neutron diffusion coefficient D by the relationship $$D = L^2/T_0. \tag{1}$$

D may be accurately calculated for any lithology fluid combination from thermal neutron cross-section data using the formula given by equation (2)

$$D^{-1} = 3/V_{TH} \epsilon (1 - \mu_0) [1 - 4/5 \, \epsilon a / \epsilon + \epsilon a / \epsilon \, \mu_0 / (1 - \mu_0) + \ldots ], \tag{2}$$

where $\epsilon$, $\epsilon_a$ are the macroscopic total and absorption cross-sections and $\mu_0$ is the average lab scattering angle's cosine; $V_{TH}$ is the thermal neutron speed. The thermal neutron diffusion coefficient D has the least salt water (strong neutron absorber) sensitivity and best dynamic range and sensitivity to porosity changes of any of the conventionally measurable neutron field parameters such as $L_s$, the slowing down length; $t_s$, the slowing down time; $L_{th}$, the thermalization length; or $t_{th}$, the thermalization time.

A convenient mathematical framework for discussion of the response of a $He^3$ detector to a pulsed neutron generator is provided by the time dependent diffusion equation for the neutron density-$n(r,t)$:

$$\partial n(r,t)/\partial t = D_0(t)\nabla^2 n(r,t) - 1/T_0 \, n(r,t) + Q_0 \, \delta(r) \, \delta(t), \tag{3}$$

where $Q_0$ is the neutron generator source strength. $Q_0 \, \delta(r) \, \delta(t)$ describes a narrow burst of neutrons created at $t=0$ at location $r=0$. The graph of the generalized neutron diffusion coefficient as a function of time is shown in FIG. 3 in the upper portion of the graph. In the graph of FIG. 3 the time period IV is that in which $D_0(t)$ is equal to its asymototic value D. The solution of equation (3) for an infinite medium with spherical symmetry is given by $$n(r,t) = Q_0 e^{-t/T_0} \, e^{-r^2/4\tau} \, 1[4\pi\tau]^{3/2} \tag{4}$$

in which the neutron age $\tau$ is given as a function of time by $$\tau(t) = \int_0^t D_0(t^1) dt^1. \tag{5}$$

$\tau(t)$, the neutron age, is plotted in the lower portion of the graph of FIG. 3. $\tau$ is 1/6 the mean squared distance from the birth or generation of the neutrons to their capture and so characterizes the spreading of the neutron field. In time period IV, $\tau$ is equal to its asymtotic value so that the neutron density function $n(r,t)$ approaches the value shown in equation (6).

$$n(r,t) \to Q_0 e^{-t/T_0} e^{-r^2/4\_(\tau_0 + Dt)} 1[4\pi(\tau_0 + Dt)]^{3/2} \quad (6)$$

$\tau_0 \ (= L_0^2)$ is the initial age of that fictitious thermal neutron distribution which, continuing to diffuse at thermal energy, would approach the same age as a 14 MEV source that slows down and thermalizes in the same medium at the same time. It may be readily appreciated by observing the graph of the neutron age in the lower portion of FIG. 3 that $\tau_0$ cannot be simply related to $L_s$, the neutron slowing down length.

The count rate of a $He^3$ detector at $(r,t)$ is proportional to $n(r,t)$ given by equation (6) for time $t$ in period IV of the graph of FIG. 3. This count rate involves the parameters $\tau_0$, $T_0$ and $D$ as well as the neutron source strength $Q_0$, and the space-time variables $(r,t)$. Consider the measurement of four count rates of the two $He^3$ detectors as given by equation (7).

$$C(r_1,t_1); \ C(r_1,t_2); \ C(r_2,t_1);$$

and $$C(r_2,t_2); \ r_2 > r_1, \ t_2 > t_1 \quad (7)$$

Ratios of these four count rates taken at two different spacial intervals and two different times are independent of $Q_0$, the neutron source strength. The following set represents the four simplest ratios that can be formed $$R_1 = C(r_1,t_1)/C(r_2,t_1) = R_0 n(r_1,t_1)/n(r_2,t_1)$$
$$R_2 = C(r_1,t_2)/C(r_2,t_2) = R_0 n(r_1,t_2)/n(r_2,t_2)$$
$$R_3 = C(r_1,t_1)/C(r_1,t_2) = n(r_1,t_1)/n(r_1,t_2)$$
$$R_4 = C(r_2,t_1)/C(r_2,t_2) = n(r_2,t_1)/n(r_2,t_2). \quad (8)$$

In the expressions of equation (8), $R_0$ is the ratio of detector sensitivities. This is a calibration constant which may be determined in a standard borehole prior to the initiation of a well logging operation and may be entered into the memory of the computers 41 and 42 of FIG. 1 to be utilized in the subsequent calculations. The ratios $R_1$, $R_2$ and $R_3$ may be considered the independent variables. The ratio $R_4$ is shown for completeness. The other ratios or other functions of the rates (7) are complex and yield no new information about $n(r,t)$ in a practical sense.

Equations (6) and (8) may be combined to show the following two relationships.

$$D = D_0 \ [1/\ln(R_2/R_0) - 1/\ln(R_1/R_0)] \quad (9)$$

and $$\tau_0 = D_0 \ [t_2/\ln(R_1/R_0) - t_1/\ln(R_2/R_0)], \quad (10)$$

where $$D_0 = r_2^2 - r_1^2/4 \ (t_2 - t_1) . \quad (11)$$

The ratios (8) and equation (6) may also be combined to show that the thermal neutron lifetime $T_0$ may be given by $$1/T_0 = \ln R_3/t_2 - t_1 + r_1^2/4 \cdot D/(\tau_0 + Dt_1)(\tau_0 + Dt_2)$$
$$- 3 \ln(\tau_0 + Dt_2/\tau 0 + Dt_1)/2 \ (t_2 - t_1) \quad (12)$$

or $$1/T_0 = \ln R_4/t_2 - t_1 + r_2^2/4 \cdot D(\tau_0 + Dt_1)(\tau_0 + Dt_2) -$$
$$3 \ln(\tau 0 + Dt_2/\tau_0 + Dt_1)/2 \ (t_2 - t_1) . \quad (13)$$

Equations (7) to (13) are instantaneous expressions valid only for narrow gates at $t_1$ and $t_2$. Suitable averaging is required for wide gates. By use of the thermal neutron coefficient D and the initial age $\tau_0$, the neutron lifetime $T_0$, can be determined, and therefrom the relative water saturation $S_w$ value in the usual way. (See "Schlumberger Log Interpretation Principles" 1969, p. 86.) This is done by computing the ratios $R_1$, $R_2$ and $R_3$ or $R_4$ and using these ratios in equations (9) to (13). The second and third terms of the right hand side of equations (12) and (13) represent a diffusion correction to the neutron lifetime $T_0$ which can be positive, negative or zero depending on the values of $R_1$, $R_2$, the formation fluid salinity and the formation lithology. This correction is largest for low porosity fresh water formations (about 20%). Measurement of $T_0$ using $R_4$ has better depth of investigation than one made with $R_3$ (since $r_2 > r_1$).

Figure 4:
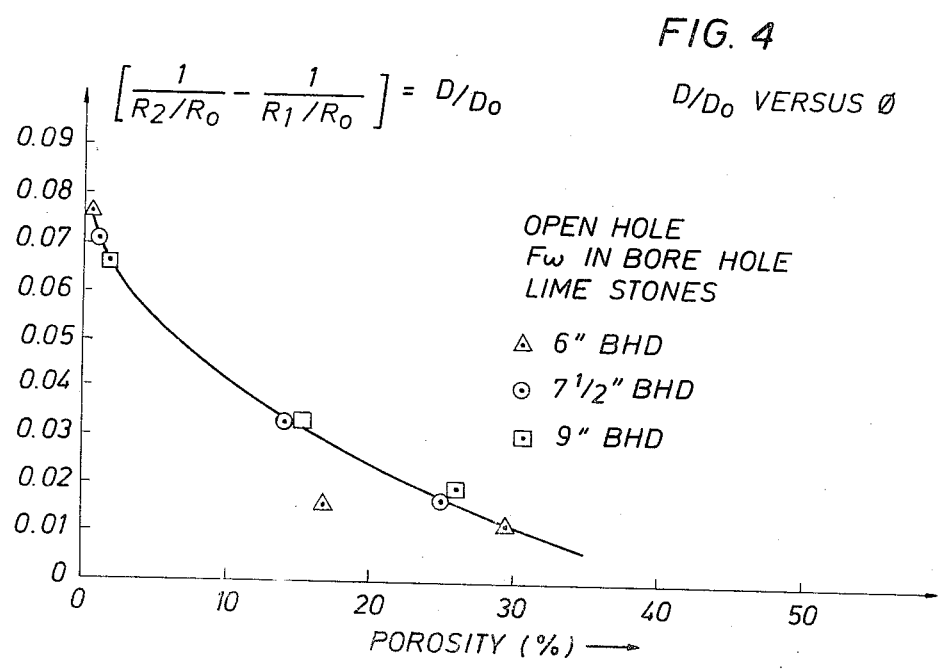
FIG. 4 is a graphical representation illustrating the thermal neutron diffusion coefficient as a function of porosity of earth formations in the vicinity of several different sized well boreholes.

When the thermal neutron diffusion coefficient D is obtained by measuring the ratios $R_0$, $R_1$, $R_2$ and using the relationships of equations (9), (10) and (11), then the porosity $\phi$ may be related to the thermal neutron diffusion coefficient D, by tool calibration made from test formation data such as that plotted in FIG. 4. The graph of FIG. 4 shows good sensitivity for porosities in excess of 20 percent and the general shape of this plot is in agreement with theoretical calculations based on equation (2). This difference in sensitivity or increase in sensitivity of the thermal neutron diffusion coefficient D as a function of porosity for those porosities in excess of 20 percent can lead to improved results in measurement of the formation porosity $\phi$ and so the thermal neutron lifetime $T_0$ (and hence water saturation $S_w$) from techniques known in the prior art.

To summarize the operation of the methods and apparatus of the present invention a burst of neutrons is emitted from the neutron source 11 in the sonde of FIG. 1. Gating circuits 40 at the surface are used to route count pulses from the dual detectors 12 and 13 in the downhole tools to the porosity computer 41 and water saturation computer 42 in the manner shown in FIG. 2. Count ratios $R_1$, $R_2$, $R_3$, $R_4$ of equation (8) are formed in these computers and are used in equations (9), (10) and (11) to derive the thermal neutron diffusion coefficient D and initial age $\tau_0$. D and $\tau_0$ are then utilized to compute an enhanced value of the thermal neutron lifetime $T_0$ from equation (12) or (13) and the porosity $\phi$ from previous tool calibration (FIG. 4). In this manner, improved estimates of water saturation $S_w$ corrected for diffusion effects and accurate porosity values with good sensitivity and minimal interference from borehole irregularities may be obtained.

The above disclosure may make other embodiments of the invention apparent to those skilled in the art. It is therefore the aim of the appended claims to cover all such changes nad modifications as come within the true spirit and scope of the invention.

I claim:

1. A method for determining the thermal neutron diffusion coefficient of earth formations in the vicinity of a well borehole comprising the steps of:
   repetitively irradiating earth formations surrounding a well borehole with bursts of fast neutrons from a neutron source;
   subsequent to a neutron burst, detecting at, at least two different spaced distances from said neutron source and during at least two different time intervals, the thermal neutron population in the well borehole and generating at least four count signals representative of the detected thermal neutron population at said at least two different spaced distances at said at least two different time intervals;
   generating a first count ratio signal representative of the ratio of said count signals at the two different spaced detectors during said first time interval subsequent to said neutron burst;
   generating a second count ratio signal representative of the ratio of said count signals at the two different spaced detectors during said second time interval subsequent to said neutron burst; and
   combining said first and second count ratio signals according to a predetermined relationship to generate a signal representative of the thermal neutron diffusion coefficient in the vicinity of the well borehole.

2. The method of claim 1 wherein said at least two different time intervals subsequent to a neutron burst are selected so as to occur at a sufficient time after said neutron burst to allow borehole effects to substantially vanish.

3. The method of claim 2 and further including the step of using said signal representative of the thermal neutron diffusion coefficient to derive according to a predetermined relationship a signal representative of the porosity of the earth formations in the vicinity of the well borehole.

4. The method of claim 2 and further including the step of using said signal representative of the thermal neutron diffusion coefficient to derive according to a predetermined relationship a signal representative of the intrinsic thermal neutron lifetime of earth formations in the vicinity of the well borehole.

5. The method of claim 2 and further including the steps of using said signal representative of the thermal neutron diffusion coefficient to derive according to a predetermined relationship signals representative of the porosity $\phi$ and intrinsic thermal neutron lifetime $T_0$ of earth formations in the vicinity of the well borehole and using said $\phi$ and $T_0$ representative signals to derive a signal representative of the water saturation $S_w$ of earth formations in the vicinity of the well borehole.

6. The method of claim 5 and further including the steps of repeating said measurements at different depths and recording said representative signals as a function of borehole depth.

7. A method for determining enhanced porosity values of earth formations in the vicinity of a well borehole comprising the steps of:
   repetitively irradiating earth formations in the vicinity of a well borehole with bursts of fast neutrons from a neutron source;
   subsequent to a neutron burst detecting at, at least two different spaced distances from said neutron source and during at least two different time intervals, the thermal neutron population in the well borehole and generating at least four count signals representative of the detected thermal neutron populations at said at least two different spaced distances at said at least two different time intervals;

generating a first count ratio signal representative of the ratio of said count signals at the two different spaced detectors during said first time interval subsequent to said neutron burst;
   generating a second count ratio signal representative of the ratio of said count signals at the two different spaced detectors during said second time interval subsequent to said neutron burst;
   generating from said first and second count ratio signals and from said representative neutron population signals, and according to predetermined relationships signals representative of the thermal neutron diffusion coefficient D and the initial neutron age $\tau_0$ of the earth formations in the vicinity of the well borehole; and
   generating from said diffusion coefficient D signals and said neutron age $\tau_0$ signals, signals representative of the porosity $\phi$ of earth formations in the vicinity of the well borehole according to predetermined relationships.

8. The method of claim 7 wherein the neutron populations are sampled at said different distances and over said different time intervals after the neutron burst at a sufficient time after said burst to allow borehole effects to substantially vanish.

9. The method of claim 8 and further including the step of using said representative porosity signal and said representative neutron diffusion coefficient signal to derive a signal representative of the intrinsic thermal neutron lifetime $T_0$ of earth formations in the vicinity of the well borehole.

10. The method of claim 9 wherein the steps are repeated at different depth levels in the wellbore and said representative signals are recorded as a function of borehole depth.

* * * * *

UNITED STATES PATENT OFFICE
CERTIFICATE OF CORRECTION

Patent No. 3,818,225  Dated June 18, 1974

Inventor(s) Michael P. Smith

It is certified that error appears in the above-identified patent and that said Letters Patent are hereby corrected as shown below:

Column 6, lines 29 and 30, Equation (2) should read:

$$D^{-1} = \frac{3}{V_{TH}} \Sigma (1 - \mu_o) [1 - \frac{4}{5} \frac{\Sigma_a}{\Sigma} + \frac{\Sigma_a}{\Sigma} \frac{\mu_o}{1 - \mu_o} + ....] \qquad (2)$$

Column 6, line 32, "$\epsilon, \epsilon_a$" should read --$\Sigma, \Sigma_a$--.

Column 6, line 59, Equation (4) should read:

$$n(r,t) = Q_o e^{-t/T_o} \frac{e^{-r^2/4\tau}}{[4\pi\tau]^{3/2}} \qquad (4)$$

Column 7, line 9, Equation (6) should read:

$$n(r,t) \to Q_o e^{-t/T} \frac{e^{-r^2/[4(\tau_o + Dt)]}}{[4\pi(\tau_o + Dt)]^{3/2}} \qquad (6)$$

Column 8, line 3, Equation (11) should read:

$$D_o = \frac{(r_2^2 - r_1^2)}{4(t_2 - t_1)} \qquad (11)$$

Column 8, lines 9 and 10, Equation (12) should read:

$$\frac{1}{T_o} = \frac{\ln R_3}{(t_2 - t_1)} + \frac{r_1^2 D}{[4(\tau_o + Dt_1)(\tau_o + Dt_2)]} - \frac{3\ln(\frac{\tau_o + Dt_2}{\tau_o + Dt_1})}{[2(t_2 - t_1)]} \qquad (12)$$

FO-1050
(5/69)

UNITED STATES PATENT OFFICE
CERTIFICATE OF CORRECTION

Patent No. 3,818,225  Dated June 18, 1974

Inventor(s) Michael P. Smith

It is certified that error appears in the above-identified patent and that said Letters Patent are hereby corrected as shown below:

Column 8, lines 16 and 17, Equation (13) should read:

$$\frac{1}{T_o} = \frac{\ln R_4}{(t_2 - t_1)} + \frac{r_2^2 D}{[4(\tau_o + Dt_1)(\tau_o + Dt_2)]} - \frac{3\ln\left(\frac{\tau_o + Dt_2}{\tau_o + Dt_1}\right)}{[2(t_2 - t_1)]} \quad (13)$$

Column 9, line 8, the word "nad" should read --and--.

Signed and sealed this 5th day of November 1974.

(SEAL)
Attest:

McCOY M. GIBSON JR.
Attesting Officer

C. MARSHALL DANN
Commissioner of Patents